United States Patent
Grosseau

[15] 3,661,069
[45] May 9, 1972

[54] VENTILATION DEVICE FOR AUTOMOTIVE VEHICLES

[72] Inventor: Albert Grosseau, Chaville, France
[73] Assignee: Societe Anonyme Automobiles Citroen, Paris, France
[22] Filed: Feb. 18, 1970
[21] Appl. No.: 12,394

[30] Foreign Application Priority Data

Feb. 26, 1969 France..................................6904943

[52] U.S. Cl..........................................................98/2.05
[51] Int. Cl................................................................B60h 1/24
[58] Field of Search......................................98/2, 2.04, 2.05

[56] References Cited

UNITED STATES PATENTS 2,729,158   1/1956   Wilfert.....................................98/2.4
2,996,255   8/1961   Boylen.....................................98/2.4
2,738,718   3/1956   Reynolds.................................98/2.4
2,860,567   11/1958  Wilfert.....................................98/2.4

Primary Examiner—Meyer Perlin
Attorney—Robert E. Burns and Emmanuel J. Lobato

[57] ABSTRACT

A ventilation device notably for automotive vehicles, comprising a pair of shutters controlling the ingress and adjusting the input of each one of two streams, respectively of fresh air and warm air, which are directed into a distributor box having at least two outlet ducts leading to two different outlet louvres, characterized in that each one of said ducts is divided into two parallel adjacent channels, and that a switch-over member rotatably mounted in a cylindrical portion of said distributor box, is adapted to be set in any one of three positions in which it is adapted to direct each stream either towards the two channels of one or the other outlet duct, or towards one of the two adjacent channels of each one of said ducts.

2 Claims, 11 Drawing Figures

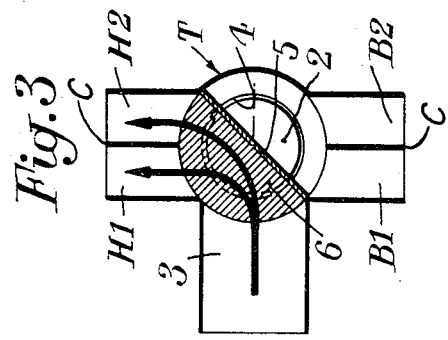
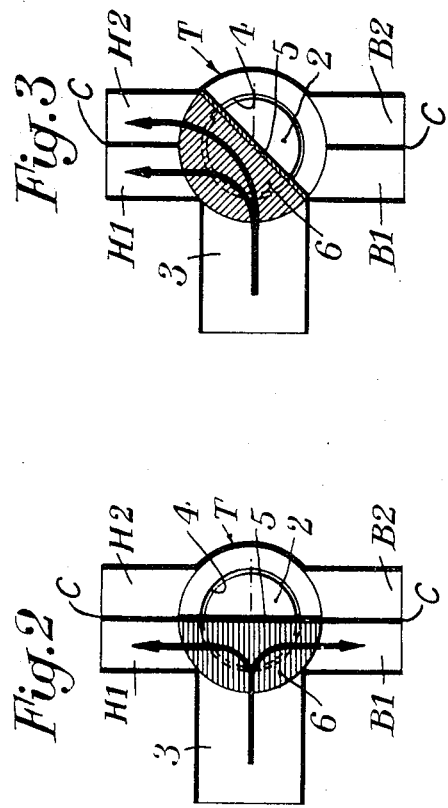
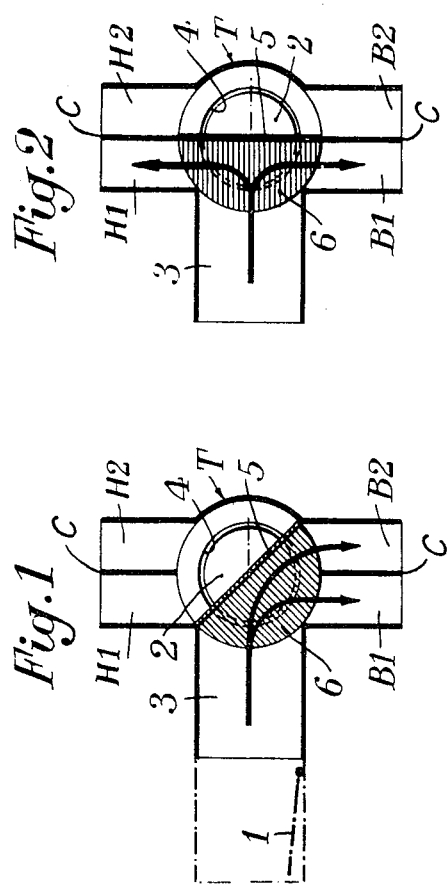
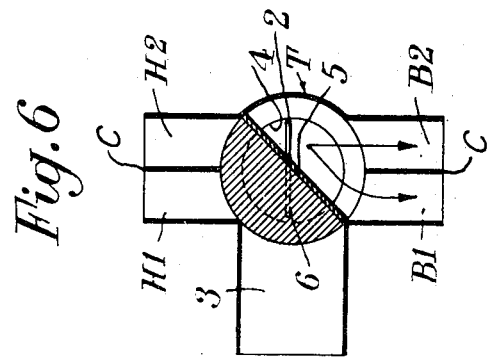
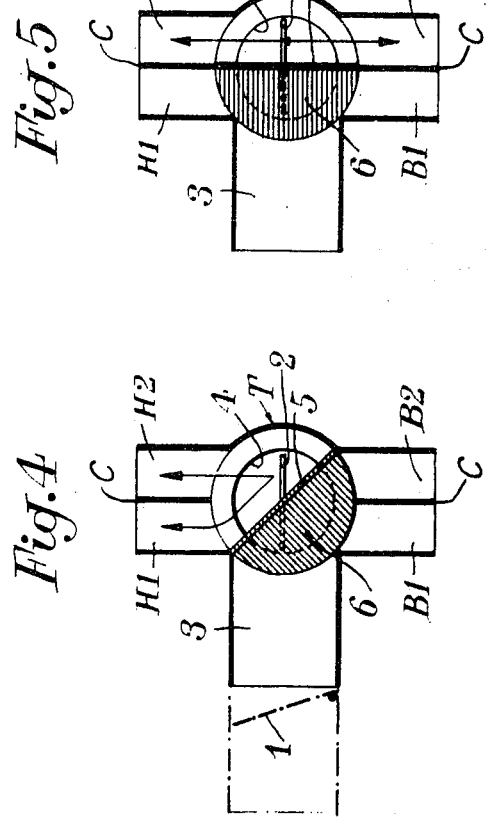
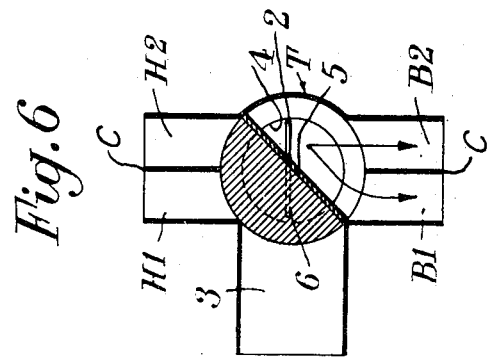

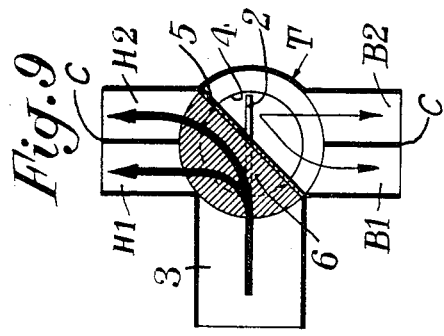
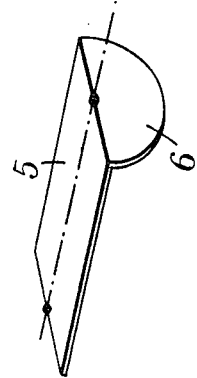
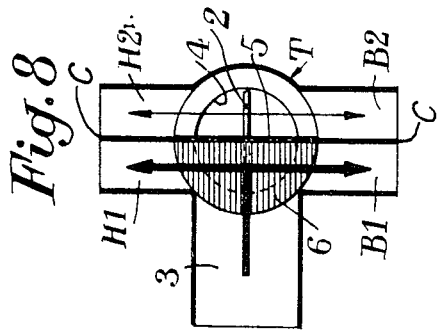
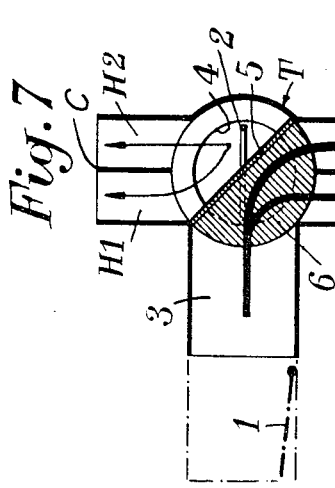
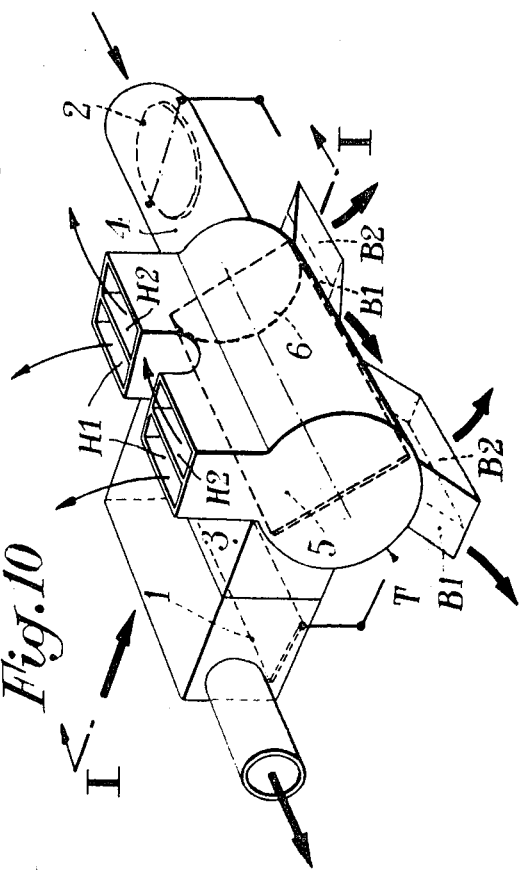

VENTILATION DEVICE FOR AUTOMOTIVE VEHICLES

SUMMARY OF THE INVENTION

The present invention relates in general to air-conditioning or ventilation systems notably for automotive vehicles and is concerned more particularly with a system of this character which permits, by actuating simple control means, and by using two streams, notably a fresh air stream and a warm air stream, of introducing the desired air stream into the passenger's compartment of the vehicle, of adjusting the air output and the direction of flow of the air towards one or the other of a pair of air outlets or louvres, for example an upper outlet for demisting the windscreen and a lower outlet for directing the air stream towards the passengers' feet, and also of proportioning at will these air streams between said two outlets or louvres.

In this system, which comprises a pair of shutters controlling the ingress and adjusting the output of each air streams towards a common box from which at least two outlet ducts lead to two different ventilation louvres, each outlet duct is divided into two adjacent channels, and a blade shutter rotatably mounted in a cylindrical portion of said box is adapted to be set in any one of three positions in which it can direct each stream either towards the two channels of one or the other of said outlet ducts, or towards one of the two adjacent channels of said two outlet ducts.

BRIEF DESCRIPTION OF THE DRAWING

The features and advantages characterizing this invention will appear more completely from the following description given with reference to the attached drawing illustrating by way of example a typical form of embodiment wherein the warm air circulation and the fresh air circulation are designated by thick-line arrows and thin-line arrows, respectively.

In the drawing:

FIGS. 1 to 3 are diagrammatic sectional views taken along a plane perpendicular to the axis of the cylindrical portion of the box, namely along the axis I—I of FIG. 10, to illustrate the circulation of the warm air stream when only the warm-air inlet shutter is open, in the three positions of the blade shutter shown therein, respectively;

FIGS. 4 to 6 are corresponding diagrammatic sectional views showing likewise the air stream circulation obtained when only the fresh air inlet shutter is open;

FIGS. 7 to 9 are corresponding diagrammatic sectional views showing the air stream circulation obtained when both warm air and fresh air inlet shutters are open;

FIG. 10 is a diagrammatic perspective view of the air-conditioning system;

FIG. 11 is a detail view showing in perspective the blade shutter used in this system.

DESCRIPTION OF THE PREFERRED EMBODIMENT

As shown in FIG. 10, the air-conditioning or ventilation system according to this invention comprises a distributor box or casing T having a main cylindrical portion into which open on the one hand a lateral warm-air inlet duct 3 (i.e. having axis perpendicular to the axis of said cylindrical portion of box T) controlled by means of an inlet shutter 1, and on the other hand an axial fresh air inlet duct 4 (i.e. having its axis substantially coincident with that of said cylindrical portion of box T) which is controlled by means of an inlet shutter 2. This cylindrical portion of the casing or box T comprises at least one upwardly-directed outlet duct and at least one downwardly-directed outlet duct. Each one of these two outlet ducts is divided by a median partition c into a pair of adjacent channels $H_1$, $H_2$ in the case of the upward duct and $B_1$, $B_2$ in the case of the downward duct. Rotatably mounted in this cylindrical portion of distributor box or casing T is a blade shutter consisting, as shown in FIG. 11, of a sheet-metal member bent at right angles into two flat portions, i.e. a rectangular portion 5 fitting in a diametral plane of said cylindrical portion of the box or casing, and adapted to rotate about its major axis, and a semi-circular portion 6 constituting a transverse valve member movable across the port through which the fresh air inlet duct 4 communicates with the inner space of box T. For controlling this system a first pair of levers (not shown) are provided which are connected to shutters 1 and 2 controlling the warm air and fresh air inlets respectively, and a third lever —not shown— is also provided for setting the blade shutter 5, 6 in anyone of its three main positions illustrated in FIGS. 1,4,7; 2,5,8; and 3,6,9, respectively.

In its first main position illustrated in FIGS. 1, 4 and 7, the diametral rectangular portion 5 of the blade shutter is inclined to the left to communicate the warm air inlet duct 3 to the pair of adjacent channels $B_1$ and $B_2$ of the downward duct, and also to communicate the fresh air inlet duct 4 to the pair of adjacent channels $H_1$ and $H_2$ of the upward duct. In this position, as well as in the other two main positions of the blade shutter, the semi-circular valve member 6 prevents any direct communication between the warm air duct 3 and the fresh air duct 4.

In the second main position of the blade shutter 5, 6 (i.e. the central position shown in FIGS. 2, 5 and 8) the rectangular diametral portion 5 of this member is disposed vertically and coplanar with the partitions provided between channels $B_1$ and $B_2$, on the one hand, and channels $H_1$ and $H_2$ on the other hand. In this position the rectangular portion 5 communicates the warm air inlet duct 3 to channels $B_1$ and $H_1$, and the fresh air inlet duct 4 to the other channels $B_2$ and $H_2$.

From the above-description it is clearly apparent that this ventilation system, of particular simple structure, construction and operation, and of very reduced overall dimensions, can be manufactured very economically, for example by punching, shaping and assembling, or alternately by moulding.

This device operates as follows:

When the inlet control shutter 1 is open (the other shutter 2 controlling the fresh air inlet being closed), as shown in FIGS. 1, 2 and 3, warm air supplied from a suitable heater is directed via inlet duct 3 into the cylindrical portion of distributor box or casing T so as to impinge against the rectangular portion 5 of the blade shutter pivotally mounted therein, and thus flow either towards the pair of adjacent channels $B_1$ and $B_2$ of the downward outlet duct (FIG. 1), or towards the pair of channels $B_1$ and $H_1$ of the downward outlet duct and of the upward outlet duct, respectively (FIG. 2), or alternately towards the pair of adjacent channels $H_1$ and $H_2$ of the upward outlet duct (FIG. 3).

When only the fresh air inlet control shutter 2 is open (FIGS. 4, 5 and 6), fresh air is allowed to penetrate through the inlet duct 4 into the cylindrical portion of box T and then either directed only upwards into channels $H_1$ and $H_2$ (FIG. 4), or between upward channel $H_2$ and downward channel $B_2$ (FIG. 5), or only downwards into both channels $B_1$ and $B_2$ (FIG. 6).

When both warm air and fresh air control shutters 1 and 2 are open, two streams are either directed the one downwards and the other upwards, or distributed among the upper and lower outlet ducts.

In FIG. 7, the whole warm air stream is shown as being directed towards the downward channels $B_1$ and $B_2$, and the whole fresh air stream is directed upwards into ducts $H_1$ and $H_2$. In FIG. 8, the warm air stream is divided into two portions directed the one into the upper channel $H_1$ and the other into the lower channel $B_1$, and the fresh air stream is also divided into two portions directed the one into the upper channel $H_2$ and the other into the lower channel $B_2$. Finally, in the position shown in FIG. 9, the whole warm air stream is directed upwards into channels $H_1$ and $H_2$, and the whole fresh air stream is directed downwards into channels $B_1$ and $B_2$.

From the above description it will be seen that the user can choose among nine different modes of ventilation or air-conditioning (FIGS. 1 to 9) corresponding to the three positions in which the pair of control levers associated with inlet shutters 2 and 1 for fresh air and warm air can be set respectively, and to the three positions in which the lever controlling the blade shutter 5, 6 can be set, respectively.

The structure of this device is such that in all the selected positions (FIGS. 1 to 9) any possibility of inadvertently mixing warm air streams with fresh air streams feeding different outlet ducts is definitely precluded.

In case the source of heat utilized for supplying warm air is the engine cooling system of a vehicle, the intermediate positions of the blade shutter 5, 6 which may be selected between the main positions set forth hereinabove, cannot create any effects likely to prove detrimental to the normal cooling conditions of the engine, due to the accelerating influence exerted by the resulting baffle action preventing any risk of back-flow.

However, return or detent-positioning means may be provided to urge the distributor control lever to its selected main positions.

The three control levers associated with the pair of inlet shutters 1, 2 and with the distributor blade shutter 5, 6, respectively, are assembled preferably with a view to suggest to the user, with the minimum of attention and memory, the simple movements required for obtaining the desired result.

With this structure and relative arrangement of the inlet and outlet ducts it will be seen (FIGS. 1 to 9) that irrespective of the selected mode of distribution of the air flow the circulation of the fluid streams takes place through passages having substantially constant cross-sectional areas.

Of course, the specific form of embodiment described hereinabove with reference to the attached drawing is given by way of illustration, not of limitation, and under these conditions many modifications and variations may be brought thereto without departing from the basic principles of this invention. Thus, notably, the functions of the air inlet ducts 3 and 4 may be reversed, if desired, the warm air being introduced axially and the fresh air radially into the cylindrical portion of casing T, and likewise fresh air may be introduced jointly into both ends of the cylindrical portion; in this case, the blade shutter will comprise another semi-circular end portion acting as a shutter with respect to the second air inlet.

What I claim is:

1. Air-conditioning system for the passenger compartments of automotive vehicles intended to be connected to two sources of air, one of hot air, the other of fresh air, which comprises a cylindrical box T, an inlet duct 3 for one of the sources of air, which opens laterally from said box T, a shutter 1 controlling said inlet duct 3, another inlet duct 4 for the other source of air which opens coaxially into said box, another shutter 2 controlling said other inlet duct 4, a pair of outlet pipes connected to said box and directed upwards and downwards, respectively, transverse median partitions extending parallel to the box axis and dividing each outlet pipe into two channels $B_1$, $B_2$, and $H_1$, and $H_2$, a blade shutter 5 rotatably mounted in said box and means for moving said blade shutter to any of three stable positions, namely a first position in alignment with said partitions C and two other positions disposed symmetrically on either side of said first position so as to direct each one of the fresh air or warm air streams either towards the two channels of either of said outlet pipes or towards one of the channels of each one of said outlet pipes.

2. Air-conditioning system as set forth in claim 1, wherein said blade shutter comprises a flat portion 5 of rectangular configuration having its major axis merged into the axis of rotation of said shutter and a semi-circular sector 6 perpendicular to said flat portion and fitted to the end of said inlet duct 3 forming the extension of said box.

* * * * *